R. W. GILPATRIC.
WHEEL.
APPLICATION FILED MAR. 7, 1918.

1,292,305.   Patented Jan. 21, 1919.

INVENTOR
RALPH W. GILPATRIC
BY Hazard & Miller
ATT'YS.

UNITED STATES PATENT OFFICE.

RALPH W. GILPATRIC, OF PASADENA, CALIFORNIA.

WHEEL.

1,292,305.  Specification of Letters Patent.  Patented Jan. 21, 1919.

Application filed March 7, 1918. Serial No. 220,908.

*To all whom it may concern:*

Be it known that I, RALPH W. GILPATRIC, a citizen of the United States, residing at Pasadena, in the county of Los Angeles and State of California, have invented new and useful Improvements in Wheels, of which the following is a specification.

My object is to make an improved pneumatic vehicle wheel without the use of a pneumatic casing, and my invention consists in the novel features herein shown, described and claimed.

Figure 3:
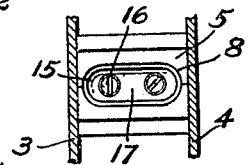
Fig. 3 is a fragmentary view on the line 3—3 of Fig. 2 showing a pair of piston blocks and one of the pistons assembled.

A hub block 1 having an axle opening 2 is clamped between circular plates 3 and 4 which extend from the hub opening outward and overlap a series of concentrically arranged cylinder blocks 5, thus forming the compressed air chamber 6, there being an air valve 7 through one of the plates. The blocks 5 are preferably formed in two pieces. Piston cylinders 8 are bored radially through said piston blocks in communication with the chamber 6. These cylinders are elongated in cross-section as shown in Fig. 3. Similarly elongated pistons 9 are mounted in the piston cylinders 8 and have piston rods 10 extending through curved plates 11 which are held securely against the outer periphery of the piston blocks by cap screws 12. Each piston is provided with two rods, the outer ends of which are riveted to spokes 13, the outer ends of said spokes being mortised into segmental blocks 14. The blocks 14 are segments of the circle of the wheel and in Fig. 1 I have shown twelve pistons and the blocks 14 must be less than one-twelfth of the circle. A cup-shaped rubber washer 15 is secured to the inner end of each piston 9 and held in place by screws 16 inserted through the center of the cup and tapped into the piston, the concavity 17 of the cup being in communication with the chamber 6, so that the pressure of the air will expand the rim of the rubber cup and make an air tight fit between the piston and cylinder. A rubber washer 18 is placed around the piston rods of each piston and fits loosely upon the piston rods in each cylinder. Stop shoulders 19 formed by the plates 11 at the outer end of the cylinder are engaged by the rubber washer 18 and limit the outward movement of the piston, the rubber washer forming a cushion to prevent jar and rattle. The blocks 14 fit as close together end to end as is practical to allow the blocks to move in radial lines toward and away from the center, and leaf springs 20 are secured to one block to press against the next block to prevent, so far as possible, dirt from getting into the opening 21 between two blocks. Plates 22 are secured to the sides of one block by rivets 23 and slidingly overlap the sides of the next block to cover the sides of the opening 21. Tread flanges 24 extend outwardly from the sides of the blocks 14 to form a peripheral groove 25 in which the rubber tire 26 is mounted. When the chamber 6 is filled with compressed air to seventy-five or one hundred pounds of pressure to the square inch, all the pistons will be forced outwardly to tighten the tire 26 and hold it normally concentric to the hub block 1. When the wheel is applied to an axle and a load placed upon the axle the lower pistons will be pressed inwardly and this action will pass from one piston to the next as the wheel rolls upon the ground.

An adjustable stop 27 is screwed into the inner end of each spoke between the piston rods. Should the pressure in the air chamber fail or fall below that required these stops may be screwed back until they contact with the plates 11, thus taking up objectionable play and producing in effect a solid wheel.

Figure 4:
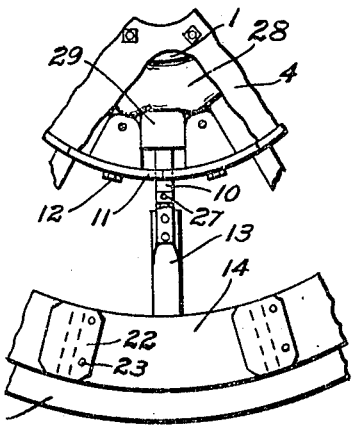
Fig. 4 is a fragmentary view partly in elevation and partly in section and showing a modified construction, there being a pneumatic inner tube in Fig. 4 and air tight pistons in Figs. 1 and 2.

In the modification shown in Fig. 4 an inner tube 28 is placed in the chamber 6 against the pistons 29 and in this construction it is not necessary that the pistons be air tight.

Figure 1:
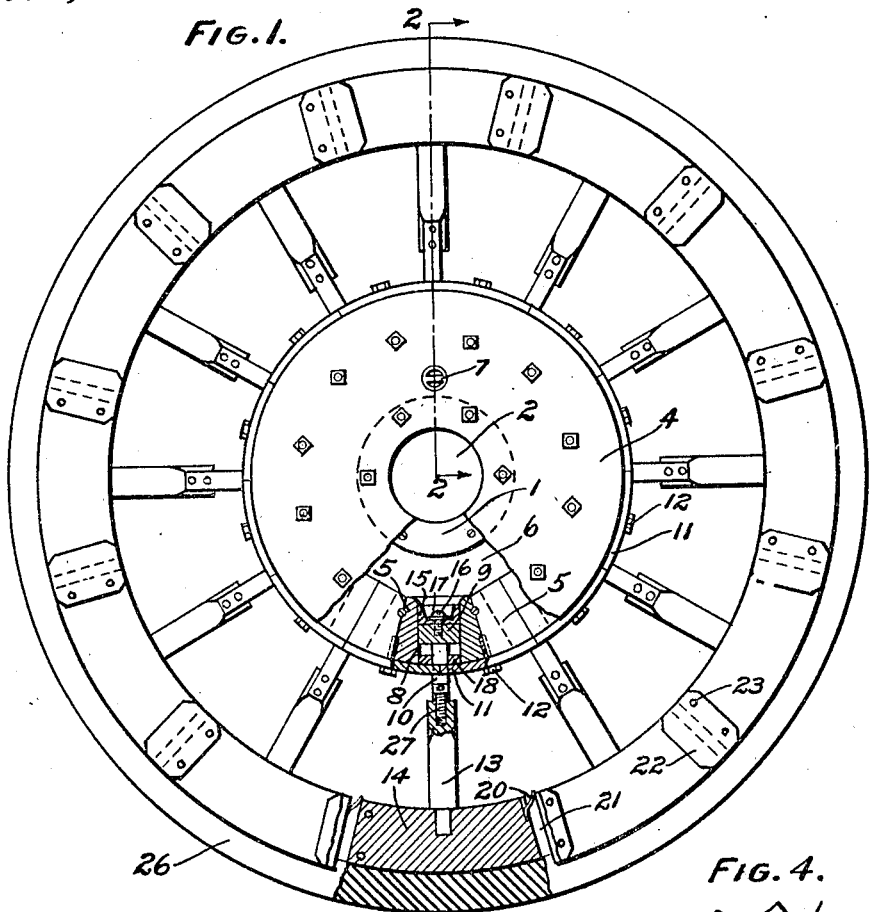
Figure 1 is a side elevation of a vehicle wheel embodying the principles of my invention, parts being broken away and shown in section.
Figure 2:
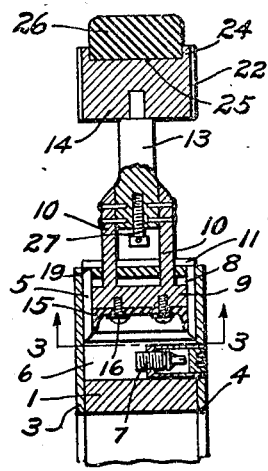
Fig. 2 is a fragmentary sectional detail on the line 2—2 of Fig. 1.

In the construction shown in Figs. 1 and 2 the curved plates 11 may be removed if access to the cylinders is desired.

Various changes may be made in the details of construction without departing from the spirit of my invention as claimed.

I claim:

A pneumatic vehicle wheel comprising a hub, plates extending outwardly from the ends of the hub, a series of cylinder blocks between the outer edges of the plates concentric with the hub and forming a compressed air chamber between the cylinder blocks and the hub, piston cylinders extending outwardly from the air chamber, pistons in the piston cylinders, piston rods extending outwardly from the pistons and riveted to spokes, segmental blocks secured to the spokes and forming a rim and a tire seat, a tire in the seat, and adjustable stops which limit the inward movement of the pistons in the cylinders.

In testimony whereof I have signed my name to this specification.

RALPH W. GILPATRIC.

Copies of this patent may be obtained for five cents each, by addressing the "Commissioner of Patents, Washington, D. C."